(12) United States Patent
Kobayashi et al.

(10) Patent No.: US 9,394,985 B2
(45) Date of Patent: Jul. 19, 2016

(54) FLEXIBLE EXTERNALLY TOOTHED GEAR, STRAIN WAVE GEARING, AND METHOD FOR FASTENING FLEXIBLE EXTERNALLY TOOTHED GEAR

(71) Applicant: HARMONIC DRIVE SYSTEMS INC., Shinagawa-ku (JP)

(72) Inventors: Masaru Kobayashi, Azumino (JP); Tatsuro Hoshina, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 259 days.

(21) Appl. No.: 14/371,446

(22) PCT Filed: May 8, 2013

(86) PCT No.: PCT/JP2013/002966
§ 371 (c)(1),
(2) Date: Jul. 10, 2014

(87) PCT Pub. No.: WO2014/181374
PCT Pub. Date: Nov. 13, 2014

(65) Prior Publication Data
US 2015/0240929 A1    Aug. 27, 2015

(51) Int. Cl.
*F16H 33/00* (2006.01)
*F16H 35/00* (2006.01)
(Continued)

(52) U.S. Cl.
CPC ............. *F16H 49/001* (2013.01); *F16D 1/076* (2013.01); *F16H 55/0833* (2013.01);
(Continued)

(58) Field of Classification Search
CPC ............ F16H 2049/003; F16H 49/001; F16H 55/0833; F16D 1/076; F16D 2069/004; F16D 2300/10

USPC .......................................................... 74/640
See application file for complete search history.

(56) References Cited

U.S. PATENT DOCUMENTS

| | | | | |
|---|---|---|---|---|
| 2002/0174742 A1* | 11/2002 | Kobayashi | ............. | F16C 33/60 74/640 |
| 2011/0116931 A1* | 5/2011 | Dessoly | .................. | F01D 5/066 416/204 A |
| 2013/0004717 A1* | 1/2013 | Moch | ................... | B23K 26/365 428/156 |

FOREIGN PATENT DOCUMENTS

| | | |
|---|---|---|
| JP | 50-089741 A | 7/1975 |
| JP | 59-133824 A | 8/1984 |

(Continued)

OTHER PUBLICATIONS
International Search Report (PCT/ISA/210) mailed on Jul. 30, 2013, by the Japanese Patent Office as the International Searching Authority for International Application No. PCT/JP2013/002966.

*Primary Examiner* — David M Fenstermacher
*Assistant Examiner* — Jake Cook
(74) *Attorney, Agent, or Firm* — Buchanan Ingersoll & Rooney PC (57) ABSTRACT

A strain wave gearing (1) has a flexible externally toothed gear (3) with a boss (7). A boss-side fastening surface (16) formed on the boss is coaxially superposed with a member-side fastening surface (15) of an output member (11), and the boss (7) and the output member are fastened by fastening bolts (13). The bolt tension of the fastening bolts (13) causes the engaging protuberances (20) of the boss-side fastening surface (16) to dig into the member-side fastening surface (15) by a predetermined dig-in depth. A large frictional force is produced in the fastening portions between the flexible externally toothed gear (3) and the output member (11). It is thereby possible to transmit the necessary torque by the bolt tension alone without using pins or a friction sheet together with the fastening bolts.

6 Claims, 10 Drawing Sheets

(51) Int. Cl.
*F16H 37/00* (2006.01)
*F16H 49/00* (2006.01)
*F16D 1/076* (2006.01)
*F16H 55/08* (2006.01)
*F16H 57/00* (2012.01)

(52) U.S. Cl.
CPC ..... *F16H 57/0025* (2013.01); *F16H 2049/003* (2013.01); *Y10T 29/49465* (2015.01); *Y10T 74/1987* (2015.01); *Y10T 74/19647* (2015.01)

(56) References Cited

FOREIGN PATENT DOCUMENTS

| | | |
|---|---|---|
| JP | 63-086454 U | 6/1988 |
| JP | 7-083211 A | 3/1995 |
| JP | 10-059192 A | 3/1998 |
| JP | 2002-339990 A | 11/2002 |
| JP | 3547645 B2 | 7/2004 |

\* cited by examiner

DIG-IN DEPTH x ≈ d
DIG-IN PROJECTED SURFACE AREA AT ≈ At
INDENTATION SURFACE AREA AR ≈ Ar
AT/AR = APPROXIMATE COEFFICIENT OF FRICTION M ≈ Max 0.43

FIG.10

FLEXIBLE EXTERNALLY TOOTHED GEAR, STRAIN WAVE GEARING, AND METHOD FOR FASTENING FLEXIBLE EXTERNALLY TOOTHED GEAR

TECHNICAL FIELD

The present invention relates to a flexible externally toothed gear of a strain wave gearing in which a fastening-target member can be reliably fastened, a strain wave gearing comprising the flexible externally toothed gear, and a fastening method for fastening the flexible externally toothed gear to the fastening-target member.

BACKGROUND ART

When a strain wave gearing is used as a reducer, reduced rotational output is typically transmitted from the flexible externally toothed gear to an output shaft on the load side. The flexible externally toothed gear and the output shaft are fixed in a fastened manner by fastening bolts. FIG. 1 of Patent Document 1 shows a structure in which a flexible externally toothed gear is fastened to the side of an output shaft by fastening bolts.

One known example of a fastening and fixing structure for two members for transmitting torque is a structure in which a friction plate is wedged between the fastened surfaces of the two members being fastened, and the two members are fixed in a fastened manner by a bolt or the like. Patent Document 2 provides a friction sheet used in such a fastening and fixing method. In this friction sheet, the surface of a metal elastic sheet is plated with diamond grains that can dig into the fastening surfaces of the fastening-target member.

For example, when a friction sheet is wedged between the fastening end surfaces of two shaft members and the fastening end surfaces are fixed in a fastened manner by a fastening bolt, the diamond grains on both sides of the friction sheet dig into the fastening end surfaces of both members and a large frictional force is produced between these fastening end surfaces. The fastening force of the two shaft members thereby increases, and a large torque can be transmitted.

PRIOR ART DOCUMENTS

Patent Documents

[Patent Document 1] JP-A 2002-339990
[Patent Document 2] JP 3547645

DISCLOSURE OF THE INVENTION

Problems to be Solved by the Invention

To increase the fastening force of the output shaft and the flexible externally toothed gear of the strain wave gearing and enable large torque transmission, a push-in pin is used together. The friction sheet disclosed in Patent Document 2 could also be used together.

However, when a push-in pin is used together, in addition to bolt holes for the fastening bolts, pin holes must be machined into a boss of the flexible externally toothed gear fastened to the fastening-target member. In a fastening and fixing structure that uses a friction sheet, diamond powder retained by the plating layer may fall off. The diamond grains that have fallen off from the friction sheet may infiltrate places such as the sliding portions between the flexible externally toothed gear and the wave generator, and the meshing portions between the flexible externally toothed gear and the rigid internally toothed gear. When the hard diamond grains get into these portions, these portions may be subjected to wear and damage.

In view of such matters, an object of the present invention is to provide a flexible externally toothed gear of a strain wave gearing in which the necessary torque can be transmitted by bolt tension alone without the need to machine in a pin hole and without the use of a friction sheet.

Another object of the present invention is to provide a strain wave gearing comprising this novel flexible externally toothed gear.

Yet another object of the present invention is to propose a fastening method for a flexible externally toothed gear whereby the necessary torque can be transmitted by bolt tension alone without the need to machine in a pin hole and without the use of a friction sheet.

Means to Solve the Above Problems

To solve the problems described above, the flexible externally toothed gear of a strain wave gearing of the present invention is characterized in comprising:

an annular or discoid boss fastened to a fastening-target member;

a boss-side fastening surface formed on the boss, the boss-side fastening surface making contact with a member-side fastening surface formed on the fastening-target member; and a plurality of engaging protuberances of a predetermined size formed at a predetermined pitch on the boss-side fastening surface;

the engaging protuberances being integrally photo-etched into the boss-side fastening surface; and the hardness of the boss-side fastening surface and the engaging protuberances being at least HRC45.

Typical engaging protuberances are tapering protuberances protruding perpendicularly from the boss-side fastening surface, the tips of the engaging protuberances being flat peak surfaces parallel to the boss-side fastening surface, and the cross-sectional shapes of the engaging protuberances orthogonal to the direction of protrusion being circular, square, or triangular.

In this case, preferably, the pitch of the adjacently arranged engaging protuberances is 0.2 to 0.5 mm, the maximum diameter or maximum width of the peak surfaces of the engaging protuberances is 0.01 to 0.05 mm, and the height of the engaging protuberances is 1.0 to 1.2 times the maximum diameter or maximum width of the peak surfaces of the protuberances.

When the maximum diameter or maximum width of the peak surfaces of the engaging protuberances is 0.03 to 0.05 mm, preferably, the depth by which the engaging protuberances dig into the member-side fastening surface is, e.g., 0.015 to 0.025 mm.

The engaging protuberances are also preferably arranged in a density of 40 to 250 per 10 $mm^2$.

When the flexible externally toothed gear of this configuration is fastened to the fastening-target member, the boss-side fastening surface of the flexible externally toothed gear is coaxially superposed with the member-side fastening surface of the fastening-target member. In this state, the fastening-target member is fastened with the boss by fastening bolts, and the bolt tension of the fastening bolts causes the engaging protuberances of the boss-side fastening surface to dig into the fastening-target member by a predetermined dig-in depth from the member-side fastening surface. A large frictional force is produced between the fastening surfaces by the engaging protuberances digging into the member-side fastening surface.

The coefficient of friction between the boss and the fastening-target member can be increased by appropriately setting the bolt tension, the strength and hardness of the boss, the hardness of the fastening-target member, the shape and size of the engaging protuberances, and the dig-in depth of the engaging protuberances. It is thereby possible to transmit the necessary torque from the flexible externally toothed gear to the fastening-target member by the fastening bolts alone, without also using pins or a friction sheet.

Consequently, there is no need to machine pin holes into the boss of the flexible externally toothed gear, or to also use a friction sheet. Because the engaging protuberances are integrally photo-etched into the boss-side fastening surface, it is possible to prevent or suppress adverse events such as the engaging protuberances detaching from the boss-side fastening surface and infiltrating the rotational sliding portions and meshing portions of the strain wave gearing.

In the method for fastening a flexible externally toothed gear of the present invention, it is also possible to form engaging protuberances in the member-side fastening surface of the fastening-target member. In this case, the hardness of the member in which the engaging protuberances are formed is preferably equal to or greater than the hardness of the other member. It is also possible to form engaging protuberances in both the boss-side fastening surface and the member-side fastening surface. In this case, the two members preferably have a similar hardness.

Specifically, the method for fastening a flexible externally toothed gear according to the present invention is characterized in that:

a member-side fastening surface is formed in a fastening-target member;

a boss-side fastening surface is formed in a boss provided to the flexible externally toothed gear in order to fasten the fastening-target member;

at least one of the fastening surfaces of the member-side fastening surface and the boss-side fastening surface is a protuberance-side fastening surface;

a plurality of engaging protuberances of a predetermined size are integrally photo-etched into the protuberance-side fastening surface at a predetermined pitch;

the hardness of the protuberance-side fastening surface is either equal to or greater than the hardnesses of the other fastening surface;

the boss-side fastening surface of the flexible externally toothed gear is coaxially superposed with the member-side fastening surface of the fastening-target member;

the boss and the fastening-target member are fastened using a fastening bolt; and bolt tension of the fastening bolt causes the engaging protuberances of the protuberance-side fastening surface to dig in up to a predetermined dig-in depth from the other fastening surface.

BRIEF DESCRIPTION OF THE DRAWINGS

FIG. 5 (a) is a partial enlarged plan view showing part of the boss-side fastening surface, (b) is a partial enlarged cross-sectional view, and (c) is a partial enlarged cross-sectional view.

FIG. 7 (a) is a partial enlarged plan view showing another example of the engaging protuberances, (b) is a partial enlarged cross-sectional view, and (c) is a partial enlarged cross-sectional view.

FIG. 8 (a) is a partial enlarged plan view showing another example of the engaging protuberances, (b) is a partial enlarged cross-sectional view, and (c) is a partial enlarged cross-sectional view.

FIG. 9 (a) is a schematic diagram showing a conic protuberance in a state of pressing into the surface of a steel material, and (b) is a schematic diagram showing an engaging protuberance in a state of digging into the boss.

MODE FOR CARRYING OUT THE INVENTION

The following is a description, made with reference to the drawings, of an embodiment of a strain wave gearing comprising a cup-shaped flexible externally toothed gear to which the present invention is applied. The present invention can also be applied to a strain wave gearing comprising a silk-hat-shaped flexible externally toothed gear.

(Strain Wave Gearing)

Figure 1:
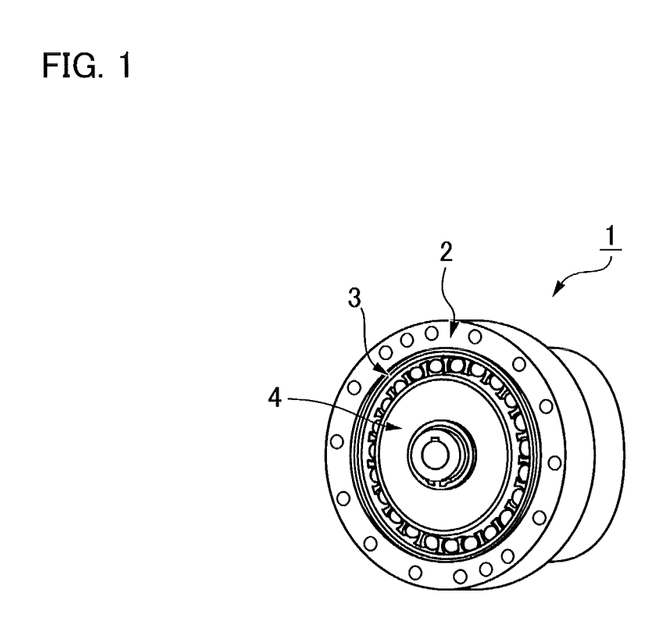
FIG. 1 A perspective view of a cup-shaped strain wave gear reducer to which the present invention is applied.
Figure 2:
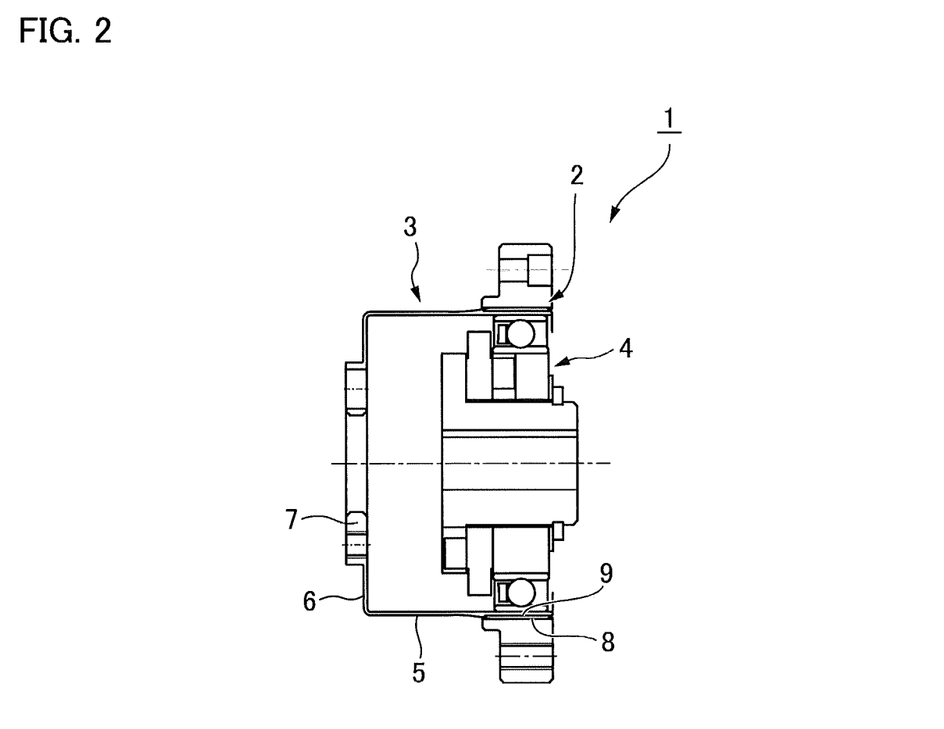
FIG. 2 A longitudinal cross-sectional view of the strain wave gear reducer.

FIG. 1 is a perspective view showing a strain wave gearing, and FIG. 2 is a longitudinal cross-sectional view thereof. The strain wave gearing 1 comprises an annular rigid internally toothed gear 2, a cup-shaped flexible externally toothed gear 3 capable of meshing with the rigid internally toothed gear 2, and an elliptically contoured wave generator 4 for causing the flexible externally toothed gear 3 to flex into an ellipsoidal shape and partially mesh with the rigid internally toothed gear 2.

The cup-shaped flexible externally toothed gear 3 comprises a cylindrical barrel part 5 capable of flexing in the radial direction, an annular diaphragm 6 extending inward from a rear end edge of the barrel part, an annular boss 7 formed as a continuation of the inner circumferential edge of the diaphragm 6, and external teeth 8 formed in the outer circumferential surface portion in the open end side of the cylindrical barrel part 5. A silk-hat-shaped flexible externally toothed gear comprises a cylindrical barrel part capable of flexing in the radial direction, an annular diaphragm extending radially outward from the rear end edge of the barrel part, an annular boss formed as a continuation of the outer circumferential edge of the diaphragm, and external teeth formed in the outer circumferential surface portion in the open end side of the cylindrical barrel part.

The wave generator 4 is fitted into the inner side of the portion of the cylindrical barrel part 5 where the external teeth 8 are formed in the flexible externally toothed gear 3. The cylindrical barrel part 5 is made to flex into an ellipsoidal configuration by the wave generator 4, and the portions of the external teeth 8 positioned at both ends of the major axis of the ellipsoidal configuration are meshed with internal teeth 9 of the rigid internally toothed gear 2.

The wave generator 4 is fixedly connected with a rotating input shaft (not shown) such as a motor shaft, and is rotatably driven by this rotating input shaft. When the wave generator 4 rotates, the meshing positions of the gears 2, 3 move in the circumferential direction. As a result, relative rotation occurs between the gears in accordance with the difference in the number of teeth between the two gears. In the present example, the rigid internally toothed gear 2 is fixed to a member on the fixed side (not shown), and the flexible externally toothed gear 3 constitutes a reduced rotation output element. The reduced rotation of the flexible externally toothed gear 3 is outputted to a member on the load side (the fastening-target member).

Figure 3:
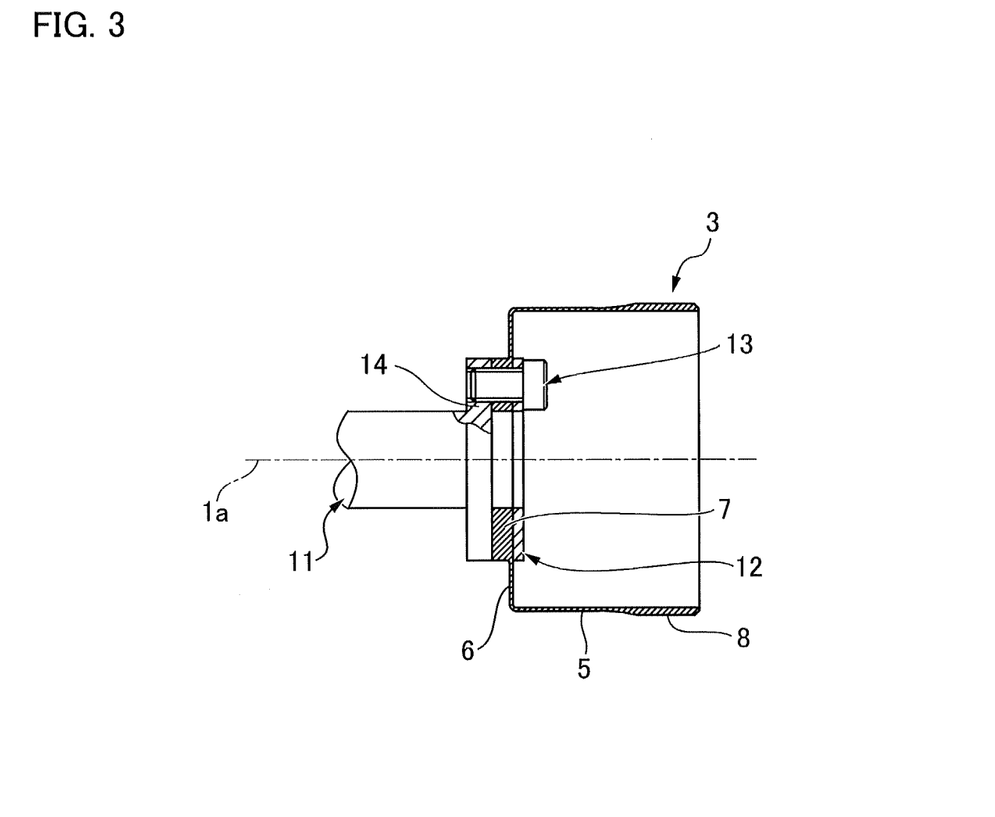
FIG. 3 A longitudinal cross-sectional view showing the fastening portion of the boss of the flexible externally toothed gear of the strain wave gear reducer and a load-side output shaft.
Figure 4:
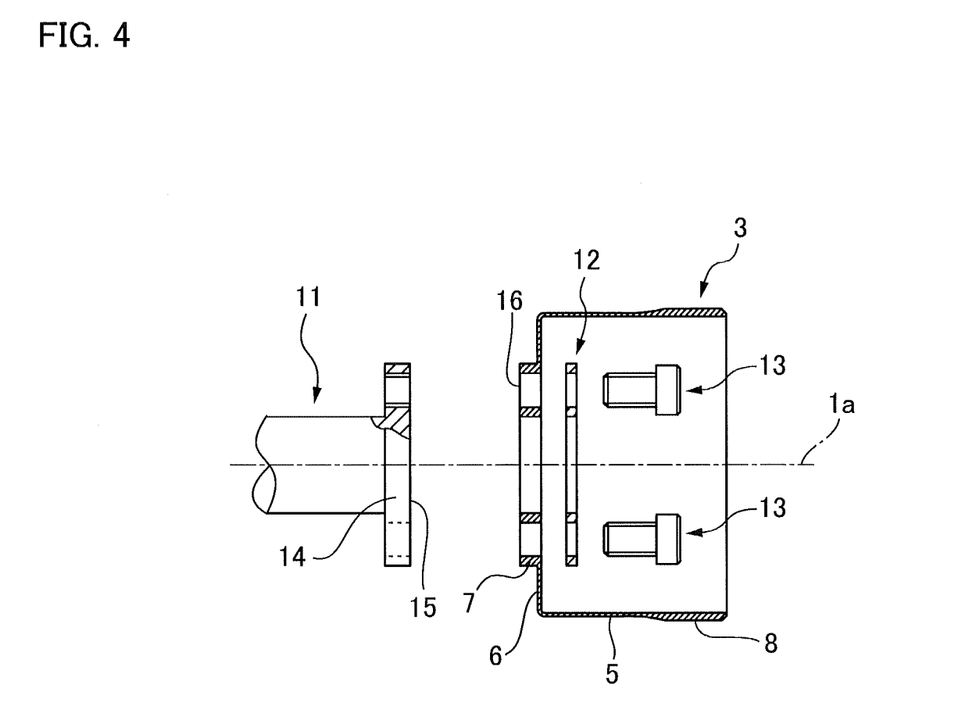
FIG. 4 A longitudinal cross-sectional view showing the structural components of the fastening portion of FIG. 3 in a dissembled state.

FIG. 3 is a longitudinal cross-sectional view showing the fastening portion of the flexible externally toothed gear 3 and the fastening target output member, and FIG. 4 is a schematic diagram showing an exploded view of the same structural components. An output member 11 on the load side is fixed in a fastened manner to the annular boss 7 of the flexible externally toothed gear 3. An annular attachment flange 12 and a plurality of fastening bolts 13 are used for this fixing in a fastened manner.

A member-side flange 14 having a large diameter is formed in the rear end of the output member 11, and a circular rear end surface of the member-side flange 14 is a member-side fastening surface 15 orthogonal to the center axis line thereof. The member-side fastening surface 15 is superposed coaxially with a boss-side fastening surface 16, which is the outer side end surface of the boss 7. The boss-side fastening surface 16 is an end surface orthogonal to the device axis 1a. The attachment flange 12 is superposed coaxially with the inner side end surface of the boss 7. Bolt holes are formed at fixed intervals in the circumferential direction in the member-side flange 14, and bolt insertion holes are similarly formed at fixed intervals in the circumferential direction in the boss 7 and the attachment flange 12. The three members are coaxially superposed so that these bolt holes and bolt insertion holes coincide, and the three members are fixed in a fastened manner with a predetermined bolt tension by the fastening bolts 13 inserted from the side of the attachment flange 12.

Figure 5:
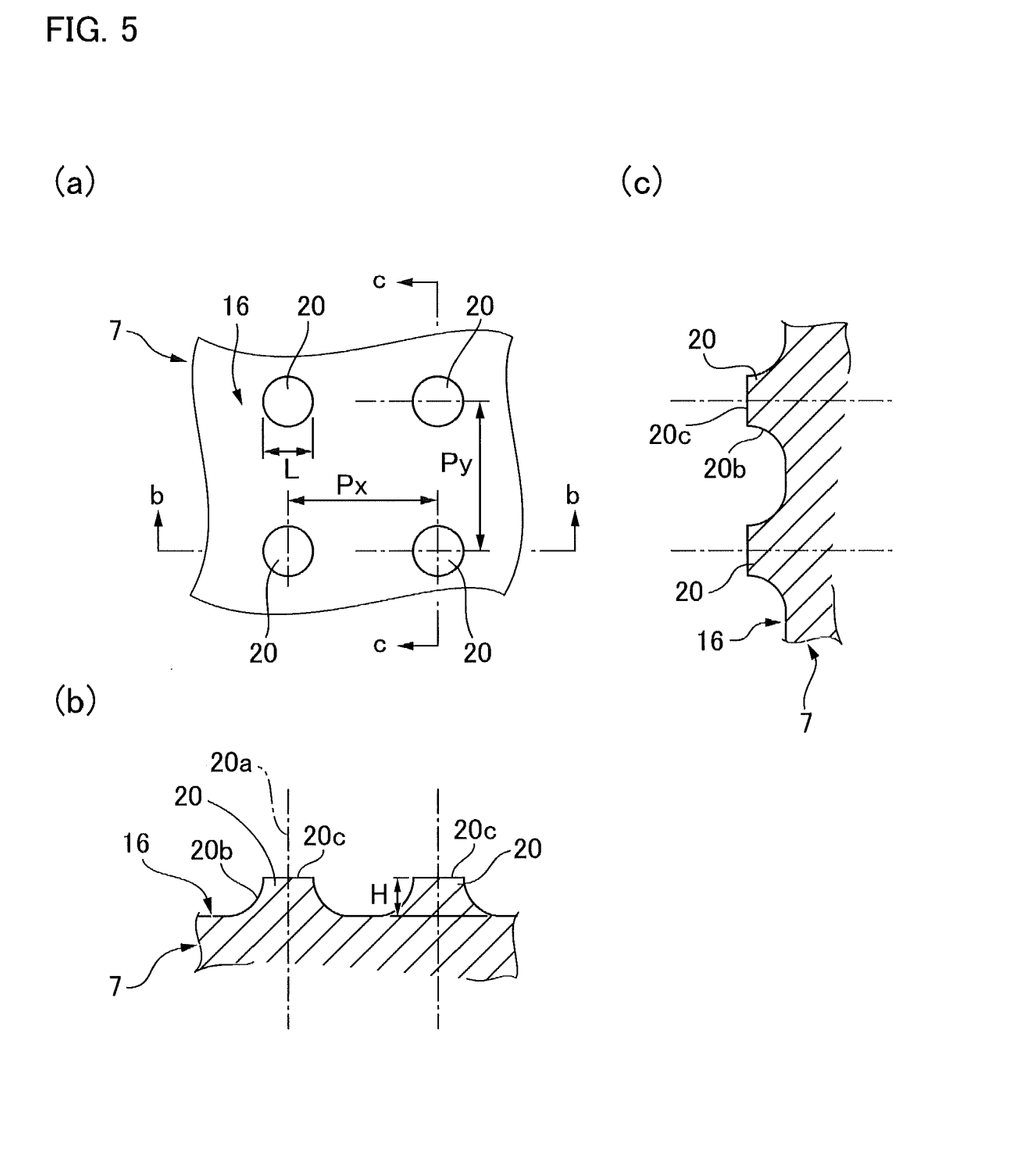

FIGS. 5(a) to (c) are, respectively, a partial enlarged plan view showing an enlarged view of the surface of the boss-side fastening surface 16, a partial enlarged cross-sectional view sectioned along line b-b, and a partial enlarged cross-sectional view sectioned along line c-c.

Engaging protuberances 20 having a predetermined shape are integrally photo-etched in the boss-side fastening surface 16 at predetermined pitches. The engaging protuberances 20 are arrayed in a matrix at fixed pitches, and the pitches Px, Py of adjacent engaging protuberances fall within a range of 0.2 to 0.5 mm. The arrayed pattern of the engaging protuberances 20 may be an arrayed pattern other than a matrix arrayed pattern.

The engaging protuberances 20 are all tapering protuberances that protrude perpendicularly from the boss-side fastening surface 16. The tips of the engaging protuberances 20 are flat peak surfaces parallel to the boss-side fastening surface 16. The cross-sectional shapes orthogonal to the direction of protrusion in the engaging protuberances 20 are circular. Specifically, in the present example, the engaging protuberances 20 are protuberances having an overall shape resembling a circular truncated cone, and the center axis lines 20a thereof are perpendicular to the boss-side fastening surface 16. The outer circumferential surfaces 20b of the engaging protuberances 20 are formed from curved surfaces that taper towards the tip. The peak surfaces 20c of the engaging protuberances 20 are flat circular surfaces orthogonal to the center axis lines 20a.

The maximum diameter L of the peak surfaces 20c in the engaging protuberances 20 is 0.01 to 0.05 mm. The height H of the engaging protuberances 20 is 1.0 to 1.2 times the maximum diameter L of the peak surfaces 20c. Therefore, the height H is 0.06 mm or less. The engaging protuberances 20 are also formed with a density of 40 to 250 per 10 mm$^2$.

In the example depicted, the diameter L of the peak surfaces 20c of the engaging protuberances 20 is 0.05 mm, the height H is 0.065 mm, and the pitches Px, Py are both 0.2 mm.

The hardness of the surface portion of the boss-side fastening surface 16 and the engaging protuberances 20 is HRC45 or greater. A material having a hardness of HRC34 or greater may be used as a blank of the flexible externally toothed gear 3. Otherwise, when the hardness of the blank is less than HRC45, a surface treatment such as a heat treatment, a carburizing treatment, or a nitriding treatment may be performed on the boss-side fastening surface 16 during either the stage before or the stage after photo-etching the engaging protuberances 20 to bring the hardness of the surface portion of the boss-side fastening surface 16 and the engaging protuberances 20 to HRC45 or greater. The material hardness of the flexible externally toothed gear 3 is commonly between HRC36 to 45, and the material hardness of the output member 11 is the same. The hardness of the boss-side fastening surface 16 and the engaging protuberances 20 is preferably equal to or greater than the hardness of the member-side fastening surface 15, on the fastening side.

Figure 6:
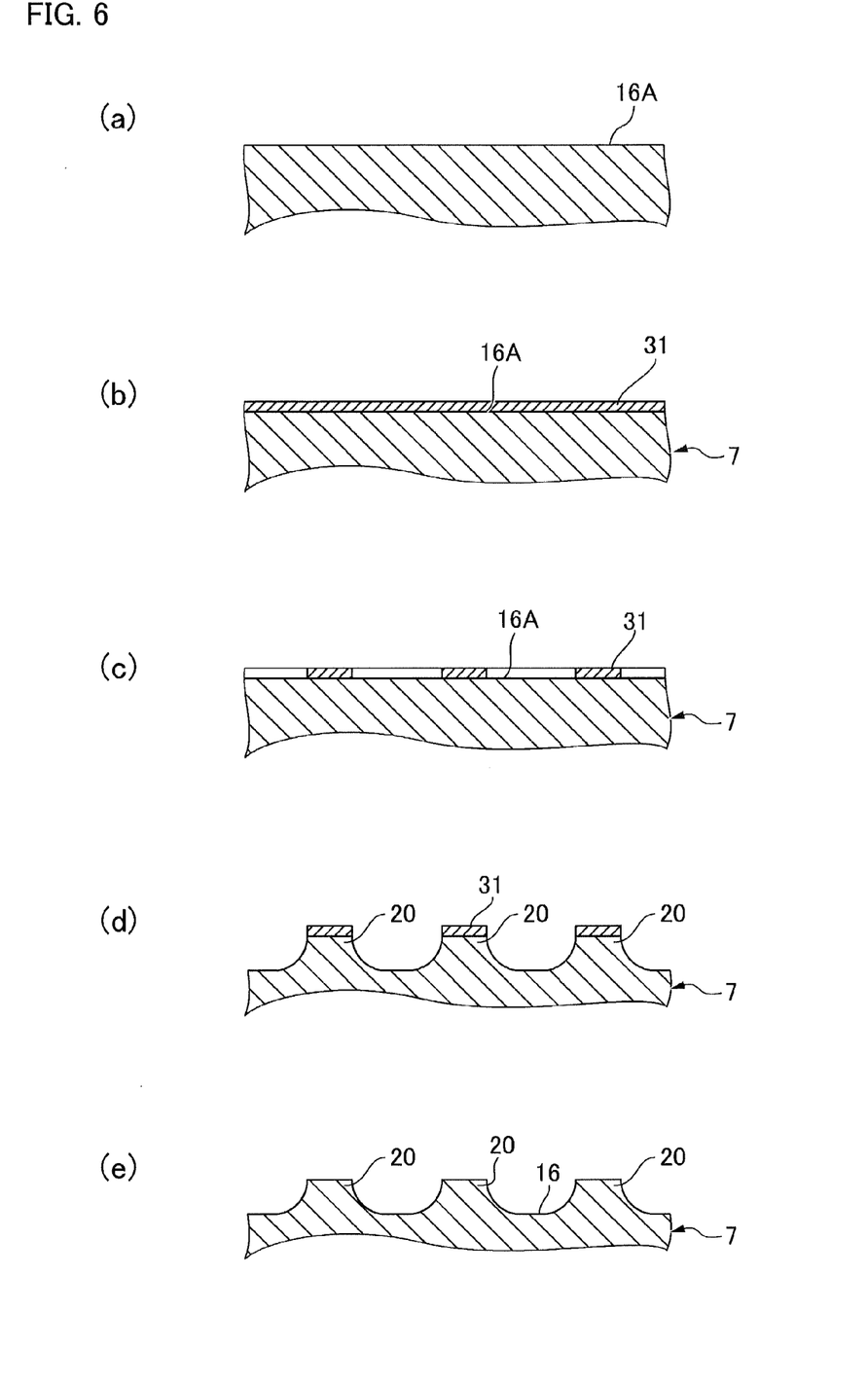
FIG. 6 A schematic diagram showing the steps of manufacturing the engaging protuberances by chemical etching.

The engaging protuberances 20 herein can be formed by common photo-etching. For example, after gear cutting is performed on the flexible externally toothed gear 3, a photo resist film 31 is formed in a state of covering the outer side end surface 16A of the boss 7, as shown in FIG. 6 (FIGS. 6(a) and (b)). The photo resist film 31 is then subjected to light exposure and image development to form a masking pattern on the photo resist film (FIG. 6(c)). Wet etching, for example, is then performed on the exposed surface portions of the outer side end surface 16A to form the engaging protuberances 20 (FIG. 6(d)). The masking pattern of the photo resist film 31 is then peeled off, and post treatments such as washing and drying steps are performed (FIG. 6(e)). Substantially circular truncated cone-shaped engaging protuberances 20, in the case that the masking pattern is circular, are thereby formed integrally in the boss-side fastening surface 16. In the case that the masking pattern is square or triangular, square truncated cone-shaped or triangular truncated cone-shaped engaging protuberances are formed.

Figure 7:
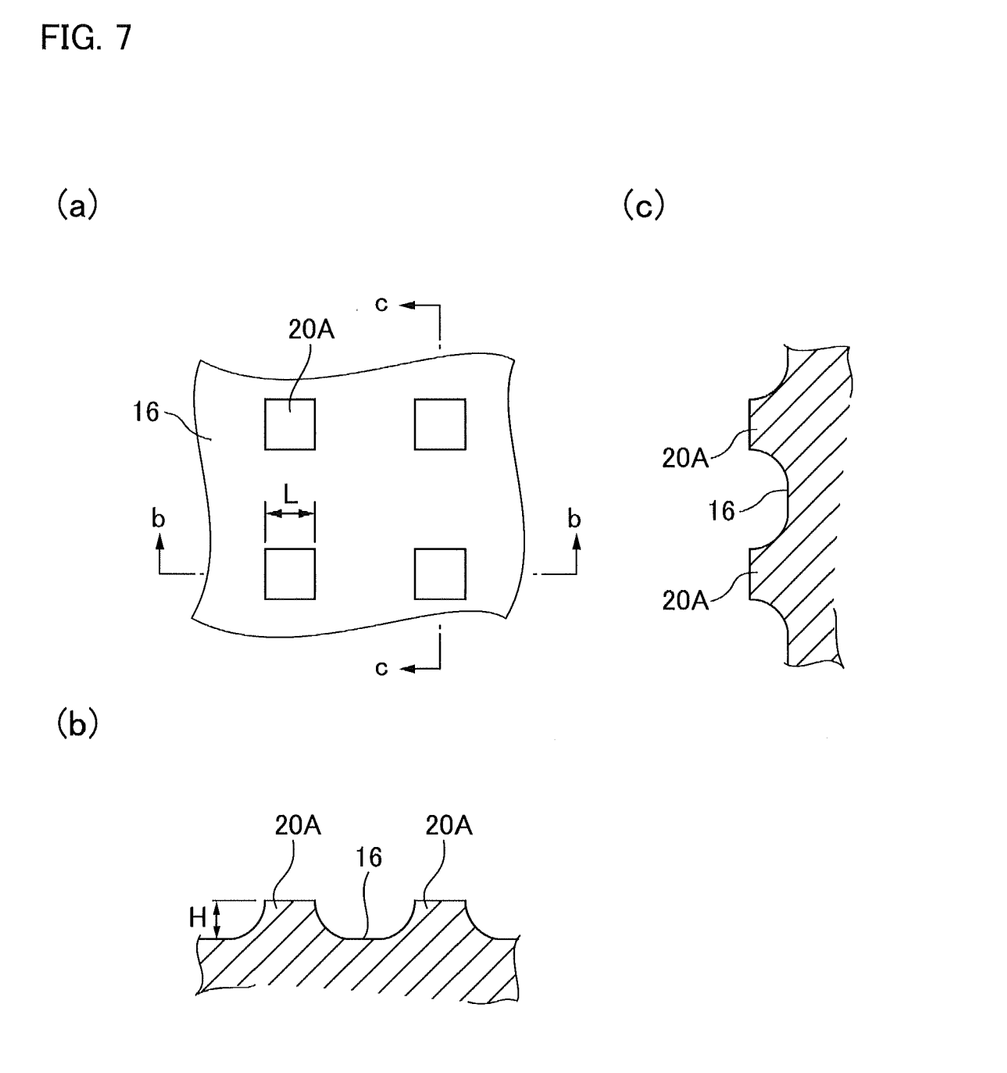
Figure 8:
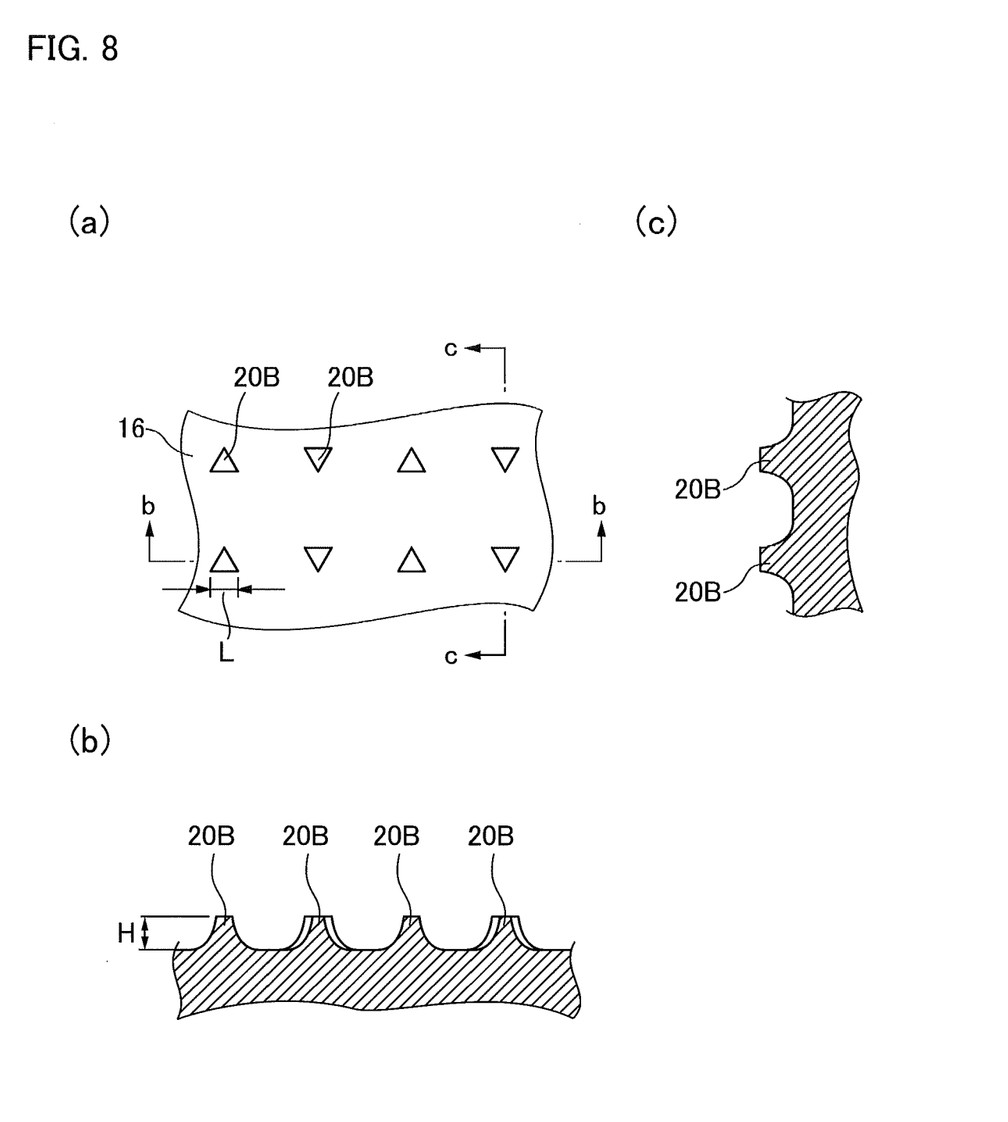

FIGS. 7 and 8 show other shapes of the engaging protuberances 20. The engaging protuberances 20A shown in FIG. 7 overall have a substantially square truncated cone shape. For example, the peak surfaces of the engaging protuberances 20A are regular tetrahedrons, the width L is 0.05 mm, the height H is 0.06 mm, and the pitch P is 0.2 mm. The engaging protuberances 20B shown in FIG. 8 overall have a substantially triangular truncated cone shape. For example, the peak surfaces of the engaging protuberances 20B are equilateral triangles, and the width L of these equilateral triangles is 0.06 mm. The height H of the engaging protuberances 20B is 0.06 mm and the pitch P is 0.2 mm. In every row of the engaging protuberances 20B arrayed in a matrix, every other triangle is reversed in orientation.

When the fastening target output member 11 is fastened to the boss 7 of the flexible externally toothed gear 3 of this configuration, the boss-side fastening surface 16 is coaxially superposed with the fastening-target member-side fastening surface 15, and the attachment flange 12 is superposed on the opposite side of the boss 7. In this state, the fastening bolts 13 are inserted from the side of the attachment flange 12, and the three members, namely the output member 11, the boss 7, and the attachment flange 12, are fixed in a fastened manner. The bolt tension of the fastening bolts 13 causes the engaging protuberances 20 of the boss-side fastening surface 16 to dig in to a predetermined dig-in depth from the fastening-target member-side fastening surface 15. A large frictional force is produced between the fastening surfaces by the engaging protuberances 20 digging into the member-side fastening surface 15.

Figure 9:
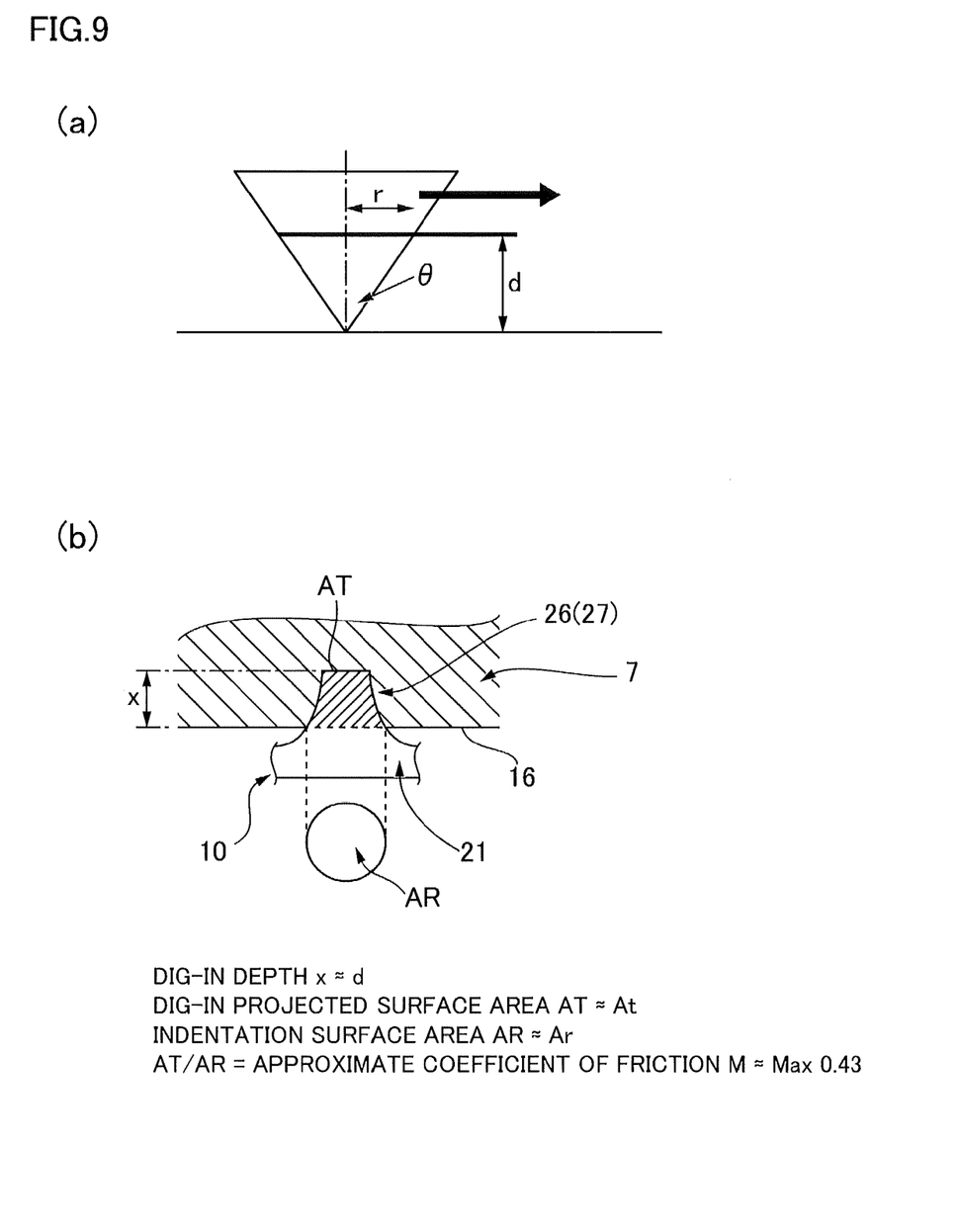

In the fastened portion of the flexible externally toothed gear 3 and the output member 11, the fastening force when the engaging protuberances 20 of the boss-side fastening surface 16 dig into the member-side fastening surface 15 can be approximated as the wear associated with digging out steel. To give a description referencing FIG. 9(a), a case is envisioned in which conic protuberances press into the fastening surface of a steel material. In this case, n conic protuberances are in contact with the fastening surface. The projected surface area (triangular) At of the conic protuberances in the advancing direction shown by the bold arrow is expressed by the following formula.

$$At = n \cdot r \cdot d = n \cdot r \cdot r \cdot \cot\theta \times n \cdot r^2 \cdot (1/\tan\theta)$$

r: the average radius of the indentations made by the conic protuberances
θ: half the apex angle of the conic protuberances
d: depth The surface area of the indentations made by the conic protuberances can be approximated as shown by the following formula.

Surface area of indentations made by conic protuberances ≈

$$\text{Real contact area } Ar = P/Pm = n \cdot \pi r^2$$

P: total load
Pm: average surface pressure of real contact area

Therefore, with F being a dig-out resistance force (frictional force), the coefficient of friction μ can be expressed by the following formula.

$$\text{Coefficient of friction } \mu = F/P = At \cdot Pm/Ar \cdot Pm = At/Ar = 1/(\pi \cdot \tan\theta)$$

When θ of the conic protuberances is 45 degrees, μ=0.3183.

FIG. 9(b) shows a case in which the circular truncated cone-shaped engaging protuberances 20 of the present example are made to dig into the member-side fastening surface 15. In this case, the values can be approximated as follows.

Dig-in depth x≈d
Dig-in projected surface area AT≈At
Indentation surface area AR≈Ar
Approximate coefficient of friction M=AT/AR The transmitted torque of the fastened portion is greatly affected by the coefficient of friction of the fastening surfaces when the engaging protuberances 20 are made to dig into the member-side fastening surface 15. The Coefficient of friction can be defined by the dig-in projected surface area AT and the indentation surface area AR as stated above. Specifically, the coefficient of friction is determined by the shape, size, and dig-in depth of the engaging protuberances 20, and by the difference in hardness between the boss-side fastening surface 16 and the member-side fastening surface 15.

Therefore, fastening surfaces having the desired coefficient of friction can be obtained by appropriately setting the shape and size of the engaging protuberances 20, the hardness of the boss 7, and the hardness of the output member 11. In the present example, the circular truncated cone-shaped engaging protuberances 20 are photo-etched. A large coefficient of friction can be achieved by giving the engaging protuberances 20 so shaped the size L of the peak surfaces, the protuberance height H, and the hardness described above.

The number of protuberances n is limited by the shear strength of the material as derived from the total indentation surface area (AR×n). In the present example, the number of protuberances n is 40 to 250 per 10 mm$^2$, taking into account the shear strength of the boss 7.

Furthermore, when the same bolt tension is applied, the dig-in depth x of the engaging protuberances differs depending on the shape of the peak surfaces of the protuberances. When the shape of the peak surfaces of the engaging protuberances is circular, square, and triangular, assuming all other conditions are equal, the triangular surfaces dig in the most easily, and the circular surfaces dig in with the most difficulty. Fastening surfaces of lower hardness have a greater dig-in depth x than fastening surfaces of higher hardness. Furthermore, the dig-in depth x of the engaging protuberances differs depending on the surface area of the peak surfaces of the engaging protuberances, and surfaces of less surface area dig in more easily. Similarly, peak surfaces of the engaging protuberances having less total surface area dig in more easily than peak surfaces having greater total surface area. Therefore, the size and shape (the shape of the peak surfaces, the surface area, and the protuberance height) of the engaging protuberances 20, the pitch and number of engaging protuberances 20 per unit surface area, and the hardness of all components are preferably set as appropriate according to the size of the boss-side fastening surface 16, the necessary transmitted torque, and the added bolt tension.

Figure 10:
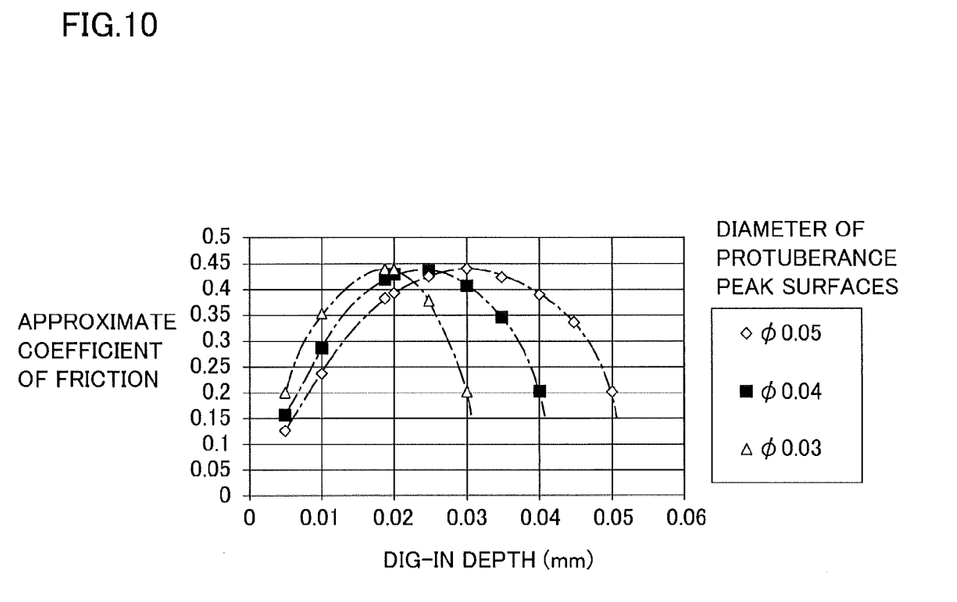
FIG. 10 A graph showing the relationship between the dig-in depth and the approximate coefficient of friction in engaging protuberances having different peak surface diameters.

FIG. 10 is a graph showing an example of the relationship between the dig-in depth (the push-in depth) and the approximate coefficient of friction, in a case in which the engaging protuberances 20 were circular truncated cone-shaped and the diameter of the circular peak surfaces was varied. The engaging protuberances 20 were arranged in a matrix, the pitch P of adjacent engaging protuberances 20 was 0.2 to 0.5 mm, there were three maximum diameters L of the peak surfaces of the engaging protuberances 20: 0.03 mm, 0.04 mm, and 0.05 mm; and the heights of the engaging protuberances 20 were 1.0 and 1.2 times the maximum diameters L of the peak surfaces of the protuberances.

As can be seen from this graph, when the maximum diameter L of the peak surfaces of the engaging protuberances 20 is 0.03 mm, the approximate coefficient of friction can be 0.35 or greater if the dig-in depth is 0.01 to 0.025 mm. When the maximum diameter L of the peak surfaces is 0.04 mm, the approximate coefficient of friction can be 0.35 or greater if the dig-in depth is 0.015 to 0.035 mm. When the maximum diameter L of the peak surfaces is 0.05 mm, the approximate coefficient of friction can be 0.35 or greater if the dig-in depth is 0.020 to 0.040 mm. When the maximum diameter L is 0.03 to 0.05 mm, the approximate coefficient of friction can be 0.35 or greater if the dig-in depth is approximately 0.015 to 0.025 mm.

Other Embodiments

In the method for fastening a flexible externally toothed gear of the present invention, it is also possible to form engaging protuberances in the member-side fastening surface of the fastening-target member. In this case, the hardness of the member in which the engaging protuberances are formed is preferably equal to or greater than the hardness of the other member. It is also possible to form engaging protuberances in both the boss-side fastening surface and the member-side fastening surface. In this case, the hardnesses of the two members are preferably approximately the same.

The invention claimed is:

1. A flexible externally toothed gear of a strain wave gearing comprising:
   a boss fastened to a fastening-target member;
   a boss-side fastening surface formed on the boss, the boss-side fastening surface making contact with a member-side fastening surface formed on the fastening-target member; and
   a plurality of engaging protuberances of a predetermined size formed at a predetermined pitch on the boss-side fastening surface;
   the engaging protuberances being integrally photo-etched into the boss-side fastening surface;
   a hardness of the boss-side fastening surface and the engaging protuberances being at least HRC45;
   the engaging protuberances being tapering protuberances protruding perpendicularly from the boss-side fastening surface;
   tips of the engaging protuberances being flat peak surfaces parallel to the boss-side fastening surface; and
   cross-sectional shapes of the engaging protuberances orthogonal to a direction of protrusion thereof are circular, square, or triangular;
   a pitch of adjacently arranged engaging protuberances is 0.2 to 0.5 mm;
   a maximum diameter or maximum width of peak surfaces of the engaging protuberances is 0.01 to 0.05 mm; and
   a height of the engaging protuberances is 1.0 to 1.2 times the maximum diameter or maximum width of the peak surfaces of the protuberances.

2. The flexible externally toothed gear of a strain wave gearing according to claim 1, wherein the engaging protuberances are arranged in a density of 40 to 250 per 10 mm$^2$.

3. A strain wave gearing comprising:
   a rigid internally toothed gear;
   a flexible externally toothed gear meshable with the rigid internally toothed gear; and
   a wave generator for flexing the flexible external gear into an ellipsoidal shape to mesh partially with the rigid internally toothed gear and for moving meshed portions of the two gears in a circumferential direction according to the rotation thereof,
   the flexible externally toothed gear being that according to claim 1.

4. A strain wave gearing comprising:
   a rigid internally toothed gear;
   a flexible externally toothed gear meshable with the rigid internally toothed gear; and
   a wave generator for flexing the flexible external gear into an ellipsoidal shape to mesh partially with the rigid internally toothed gear and for moving meshed portions of the two gears in a circumferential direction according to the rotation thereof,
   the flexible externally toothed gear being that according to claim 2.

5. A method for fastening a flexible externally toothed gear of a strain wave gearing with a fastening-target member, the method for fastening the flexible externally toothed gear comprising:
   superposing the boss-side fastening surface of the flexible externally toothed gear according to claim 1 coaxially with a member-side fastening surface of the fastening-target member;
   fastening the fastening-target member with the boss by fastening bolts; and
   with bolt tension of the fastening bolts, making the engaging protuberances of the boss-side fastening surface to dig into the fastening-target member by a predetermined dig-in depth from the member-side fastening surface.

6. A method for fastening a flexible externally toothed gear of a strain wave gearing with a fastening-target member, the method for fastening the flexible externally toothed gear comprising:
   superposing the boss-side fastening surface of the flexible externally toothed gear according to claim 2 coaxially with a member-side fastening surface of the fastening-target member;
   fastening the fastening-target member with the boss by fastening bolts; and
   with bolt tension of the fastening bolts, making the engaging protuberances of the boss-side fastening surface to dig into the fastening-target member by a predetermined dig-in depth from the member-side fastening surface.

* * * * *